United States Patent [19]
Ito

[11] Patent Number: 5,400,193
[45] Date of Patent: Mar. 21, 1995

[54] CASSETTE LOADING DEVICE

[75] Inventor: Shigehiro Ito, Hyogo, Japan

[73] Assignee: Mitsubishi Denki Kabushiki Kaisha, Tokyo, Japan

[21] Appl. No.: 919,235

[22] Filed: Jul. 27, 1992

[30] Foreign Application Priority Data

Aug. 28, 1991 [JP] Japan .................. 3-216841

[51] Int. Cl.⁶ .......................................... G11B 5/008
[52] U.S. Cl. ...................................... 360/96.5; 360/95
[58] Field of Search ................... 242/198, 199, 200; 360/95, 96.1, 96.5, 93, 96.6, 99.06

[56] References Cited

U.S. PATENT DOCUMENTS

| | | | |
|---|---|---|---|
| 3,870,247 | 8/1975 | Carisey | 242/198 |
| 4,096,536 | 6/1978 | Cicatelli | 360/96 |
| 4,402,024 | 8/1983 | Kato | 360/96.5 |
| 4,799,117 | 1/1989 | Ohyama | 360/96.5 |
| 5,088,655 | 2/1992 | Nakanishi | 242/198 |
| 5,119,251 | 6/1992 | Matsuda | 360/96.5 |
| 5,151,835 | 9/1992 | Nakanishi | 360/96.5 |
| 5,166,844 | 11/1992 | Tanaka et al. | 360/99.06 |

FOREIGN PATENT DOCUMENTS

| | | | |
|---|---|---|---|
| 3707830 | 3/1987 | Germany. | |
| 0146652 | 11/1980 | Japan | 360/96.1 |
| 62-142749 | 9/1987 | Japan. | |
| 3185666 | 8/1991 | Japan. | |

Primary Examiner—John H. Wolff
Assistant Examiner—William J. Klimowicz

[57] ABSTRACT

In a cassette loading device, an engaging member 4b engaging with the fitting part 1a of a cassette 1 is moved back and forth along guide holes 2a formed in the upper surface of a cassette holder. As the engaging member is moved in this manner, the cassette 1 is moved back and forth in the cassette holder 2 to open and close the slider 1b of the cassette 1. The engaging member 4b is operated with swing arms 5 provided on the cassette holder 2. According to this arrangement, when a cassette is loaded, insertion of the cassette can be achieved with a small pushing stroke and with a small pushing force. Further, the cassette is ejected smoothly without pushing members striking against the front end face of the cassette and is prevented from changing in posture or falling off the cassette holder while being loaded or ejected. Furthermore, the cassette loading device can be decreased in depth.

11 Claims, 11 Drawing Sheets

CASSETTE LOADING DEVICE

BACKGROUND OF THE INVENTION

This invention relates to a cassette loading device of front loading type such as a DAT (digital audio tape) cassette loading device for a vehicle.

Figure 12:
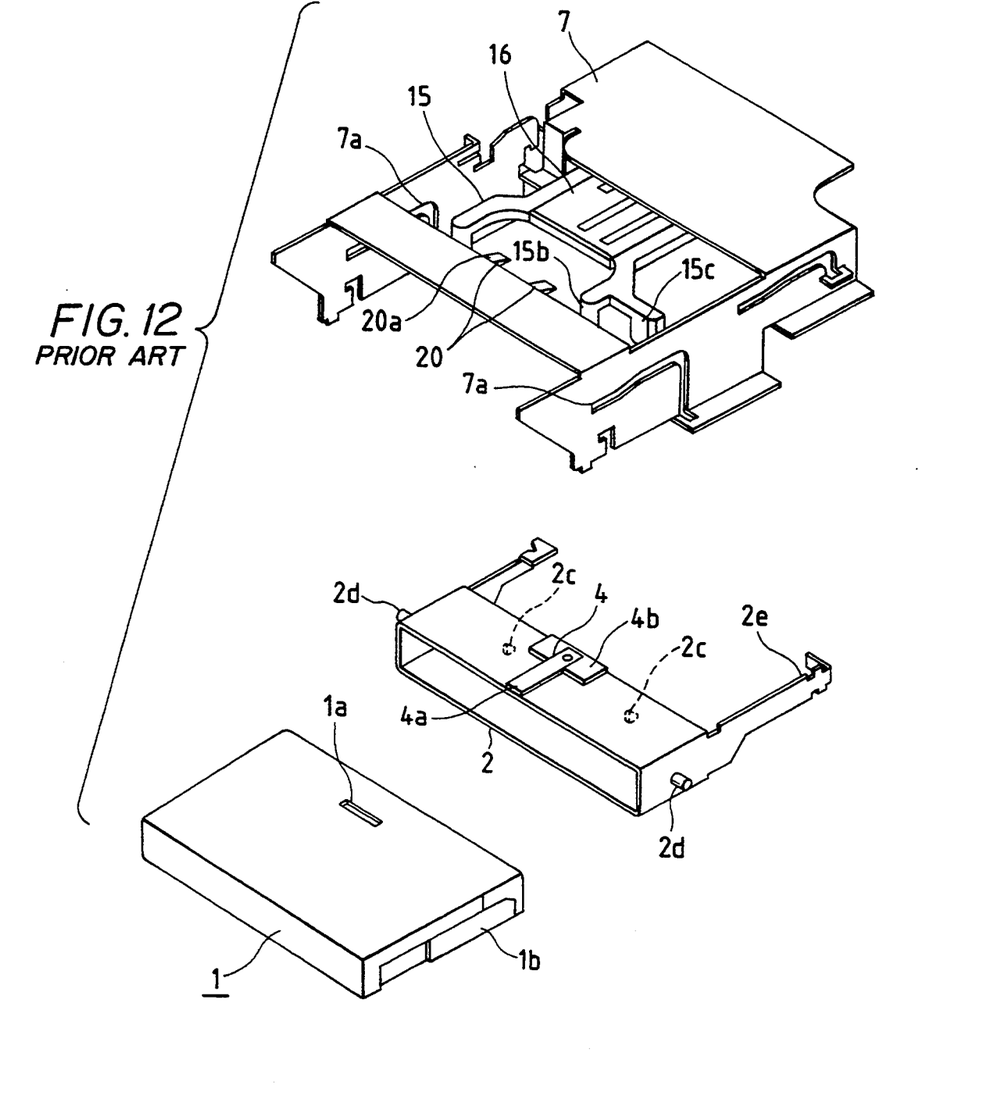
FIG. 12 is an exploded perspective view showing a conventional cassette loading device.

FIG. 12 is an exploded perspective view of a conventional cassette loading device disclosed by Japanese Patent Application (OPI) No. 270155/1990 (the term "OPI" as used herein means an "unexamined published application"). In FIG. 12, reference numeral 1 designates a DAT cassette incorporating a magnetic tape (hereinafter referred to merely as "a cassette", when applicable); 1a, a fitting part formed on the cassette 1; 1b, a slider; 2, a cassette holder which, while holding a cassette 1, is moved between a cassette inserting position and a cassette loading position; and 4, an elastic engaging member whose base end portion is connected to the cassette holder 2. The elastic engaging member 4 is to be locked to the fitting part 1a, and comprises a hook 4b secured to the end of the leaf spring 4a to be urged toward cassette holder 2. Further in FIG. 12, reference numeral 7 designates a frame U-shaped in section for guiding the cassette holder; 7a, L-shaped guide grooves formed in both side walls of the frame 7; 2d, guide pins protruded from both side walls of the cassette holder 2, the guide pins being moved along the guide grooves 7a, respectively; and 20, disengaging members secured to the frame 7 to disengage the hook 4b from the fitting part 1a of the cassette 1.

Figure 13:
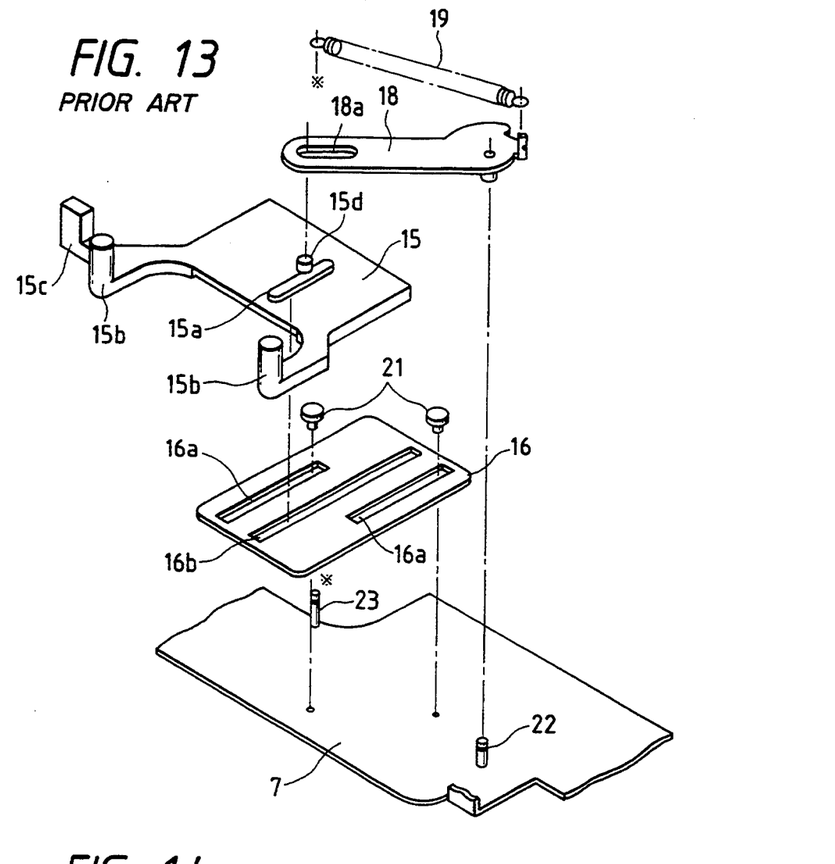
FIG. 13 is an exploded perspective view showing essential components in the conventional cassette loading device.

FIG. 13 is an exploded perspective view of the frame 7 set upside down in FIG. 12. In FIG. 13, reference numeral 15 designates a slide lever which is moved abutting against the front end face of the cassette 1; 16, a slide plate provided below the slide lever 15 and mounted movably on the upper surface (which is the lower surface in FIG. 12) of the frame 7 with the aid of guide pins 21, the slide plate 16 having plate holes 16a and a slide hole 16b; 15a, a guide protrusion formed on the lower surface of the slide lever 15 and moved along the slide hole 16b of the slide plate 16; 15b, pushing parts provided at the front end of the slide lever 15 to abut against the front end face of the cassette 1; and 15c, an arm provided on one side of the slide lever 15, to abut against a protrusion 2e of the cassette holder 2.

Further in FIG. 13, reference numeral 18 designates a swing lever rotatably supported on a first post 22 which is protruded from the upper surface of the frame 7; and 18a, a loose hole formed in the end portion of the swing lever 18 and engaged with a pin 15d provided on the upper surface of the slide lever 15; and 19, a reversing spring connected between the base end of the swing lever 18 and a second post 23 on the upper surface of the frame 7.

Now, the cassette loading operation of the cassette loading device thus constructed will be described with reference to FIGS. 14 through 18.

Figure 14:
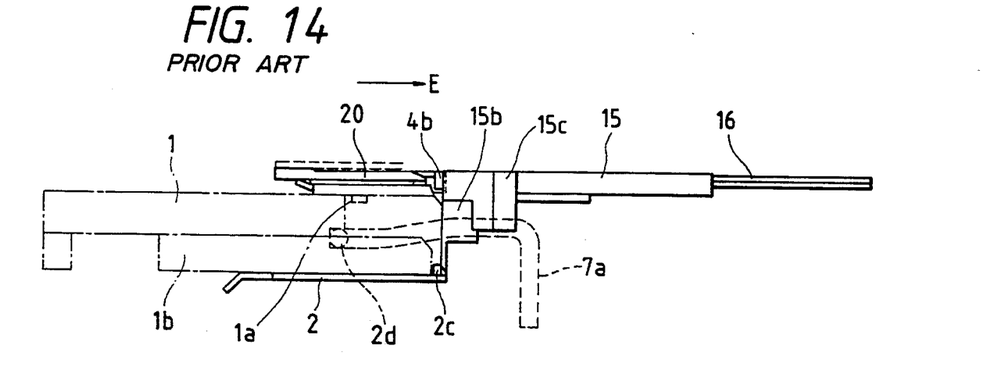
FIG. 14 is a side view showing a state of the conventional cassette loading device with a cassette at a first cassette inserting position.
Figure 15:
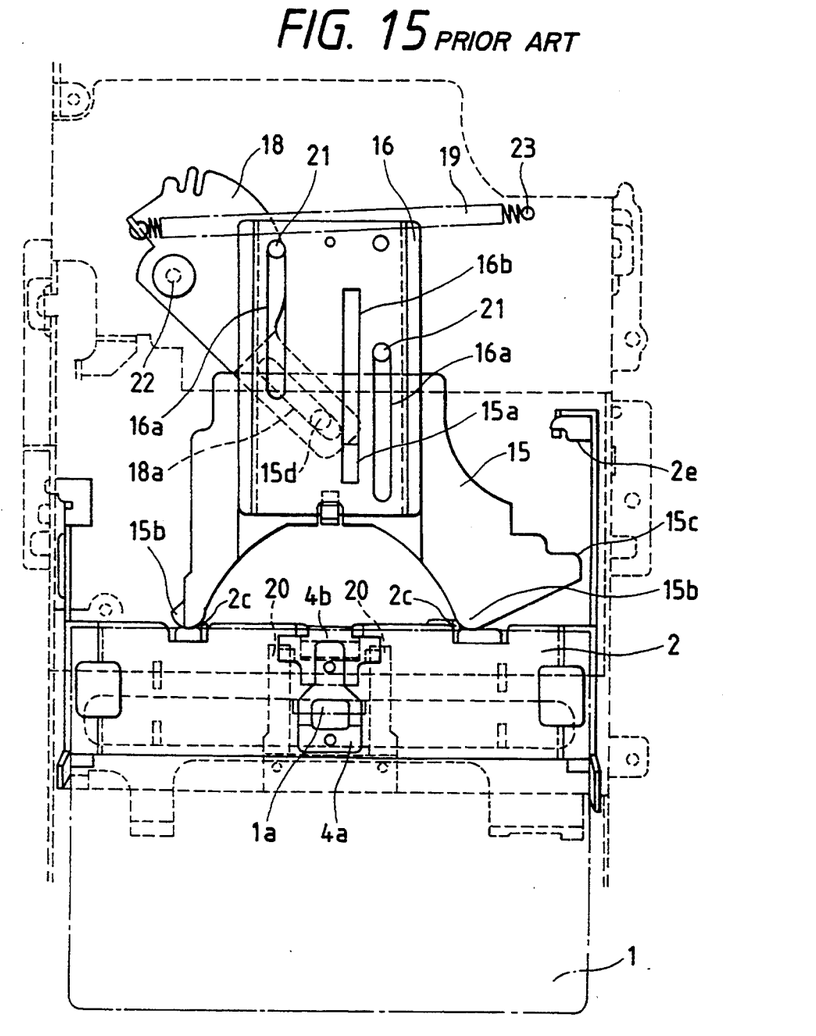
FIG. 15 is a plan view showing the state of the conventional cassette loading device with the cassette at the first cassette inserting position.

In the cassette loading operation, the cassette 1 is inserted into the cassette holder 2 as shown in FIG. 14; that is, the cassette 1 is held abutting against the pushing parts 15b provided at the front end of the slide lever 15. In this case, the hook 4b of the elastic engaging member 4 rides on the disengaging members 20, so that the cassette 1 can be removed if necessary. This position of the cassette 1 as shown in FIGS. 14 and 15 will be referred to as "a first cassette insertion position".

Figure 16:
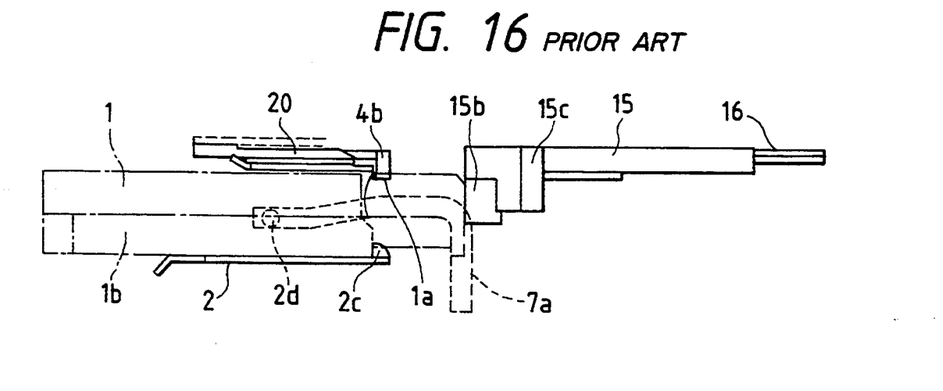
FIG. 16 is a side view showing a state of the conventional cassette loading device with the cassette at a second cassette inserting position.
Figure 17:
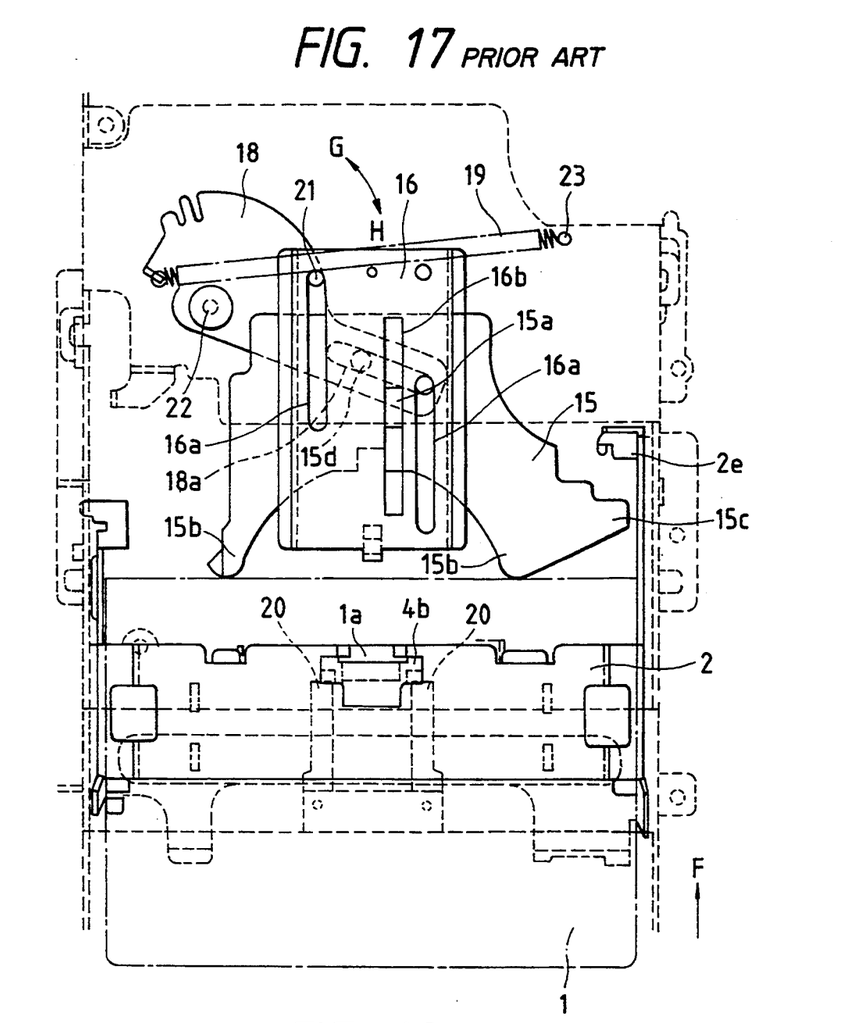
FIG. 17 is a plan view showing the state of the conventional cassette loading device with the cassette at the second cassette inserting position.

Thereafter, when the cassette 1 is further pushed in the direction of the arrow E manually, pawls 2c of the cassette holder 2 abut against the slider 1b of the cassette 1 to open it, and the hook 4b leaves the disengaging members 20 and engages with the fitting part 1a of the cassette 1 as shown in FIG. 16. This position of the cassette will be referred to as "a second cassette insertion position". When the cassette 1 is pushed in the direction of the arrow F in FIG. 17, the slide lever 15 is guided by the guide protrusion 15a loosely engaged with the slide hole 16b, thus striking a start switch (not shown) against the elastic force of the reversing spring 19.

Figure 18:
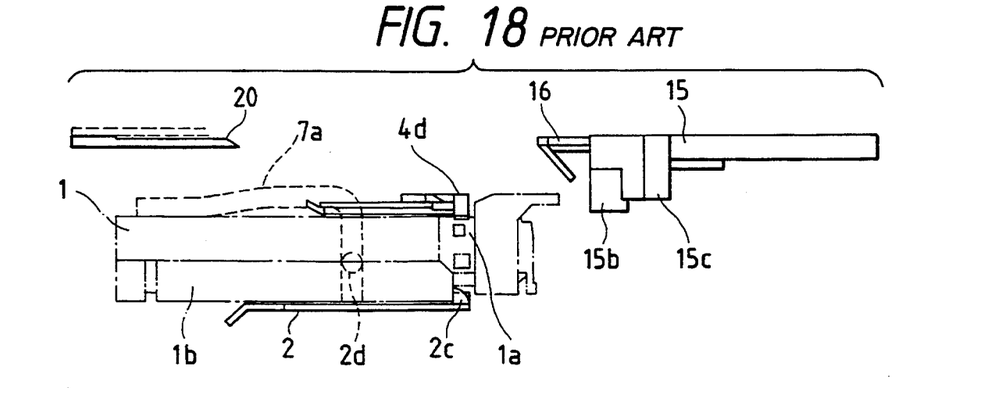
FIG. 18 is a side view showing a state of the conventional cassette loading device with the cassette at a cassette loading position.

When the start switch is operated in this manner, cassette holder moving means (not shown) is activated, so that while the guide pins 2d are moved along the guide grooves 7a, the cassette 1 and the cassette holder 2 are moved, as one unit, in the direction of the arrow F. In this operation, the slide lever 15 is moved in the same direction as the cassette holder. In association with the movement of the slide lever, the swing lever 18 is turned in the direction of the arrow G with the aid of the pin 15d of the slide lever 15. When the reversing spring 19 has passed through the toggle point, the slide lever 15 is disengaged from the cassette 1 by the elastic force. In this operation, the guide protrusion 15a abuts against the end wall of the slide hole 16b, so that the slide lever 15 and the slide plate 16 are moved as one unit. Thereafter, the cassette holder 2 and the cassette 1 are moved downwardly to a predetermined loading position as shown in FIG. 18.

Now, the cassette ejecting operation of the cassette loading device will be described.

The cassette 1 and the cassette holder 2 are moved in the directions opposite to those described above. With the slider 1b of the cassette 1 opened, the cassette is moved to the second cassette insertion position. Thereafter, the hook 4b is caused to ride on the disengaging members 20 to permit the removal of the cassette 1. During the movement of the cassette, the protrusion 2e of the cassette holder 2 moved by moving means (not shown) is abutted against the arm 15c of the slide lever 15, to push the latter 15 towards the cassette insertion position. As the slide lever 15 is moved in this manner, the swing lever 18 is turned in the direction of the arrow H. When the reversing spring 19 has passed through the toggle point, with the aid of the elastic force the pushing parts 15b push the front end face of the cassette 1 which is ready to be removed, to close the slider 1b. Thus, the cassette is pushed out to the first cassette insertion position shown in FIGS. 14 and 15.

The conventional cassette loading device is designed as described above. In the cassette loading operation, the manual operation of pushing the cassette is utilized to open the slider of the cassette, and to push the slide lever against the elastic force of the reversing spring to turn the swing lever thereby to turn on the start switch. Hence, a stroke of manual pushing of the cassette is long, and a force required for pushing the cassette is large. That is, with the conventional cassette loading device, insertion of the cassette feels unacceptable.

Furthermore, in the cassette ejecting operation, the reversing spring releases its elastic force abruptly when it has passed through the toggle point. Therefore, the inertial forces of the slide lever and the swing lever are added to the elastic force of the reversing spring, so that the cassette is ejected too much. As a result, the cassette may fall off the cassette holder, or the slide lever strikes against the cassette, thus producing big striking sounds. This may degrade the product.

SUMMARY OF THE INVENTION

Accordingly, an object of this invention is to eliminate the above-described difficulties accompanying a conventional cassette loading device. More specifically, an object of the invention is to provide a cassette loading device with which, when a cassette is loaded, insertion of the cassette can be achieved with a short pushing stroke and with a small pushing force, and when the cassette is ejected, it will not fall off from the cassette holder and no striking sound is generated.

The foregoing object of the invention has been achieved by the provision of a cassette loading device comprising: a cassette holder in which a cassette is inserted, said cassette holder being moved between a cassette inserting position and a cassette loading position; a frame for guiding said cassette holder; and an engaging member adapted to engage with a fitting part of a cassette, in which, according to the invention, the engaging member is moved along a guide groove formed in the cassette holder as the cassette holder is moved.

In the cassette loading device of the invention, the engaging member adapted to engage with the fitting part of the cassette is operated over the cassette holder, whereby the slider of the cassette can be opened during operation of the mechanism. When the cassette holder is at the cassette inserting position, the engaging member is temporarily engaged with the fitting part of the cassette, and during operation of the mechanism, the swing arms are turned to prevent the removal of the engaging member from the fitting part of the cassette. In the cassette ejecting operation, the cassette is moved back to the cassette inserting position with the engaging member kept engaged with the fitting part of the cassette.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of this invention will be described with reference to the accompanying drawings.

Figure 1:
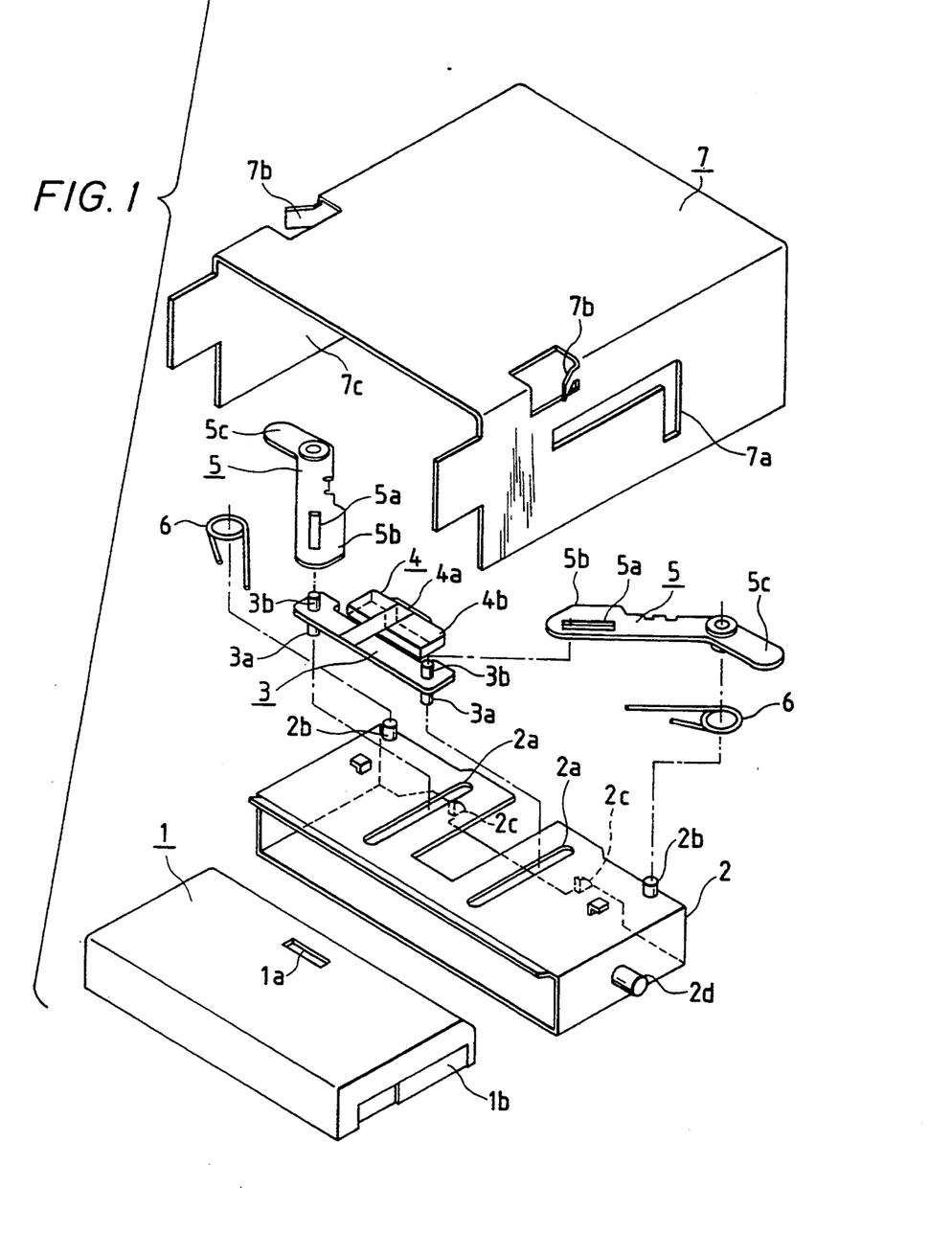
FIG. 1 is an exploded perspective view showing a first example of a cassette loading device, which constitutes a first embodiment of this invention.
Figure 2:
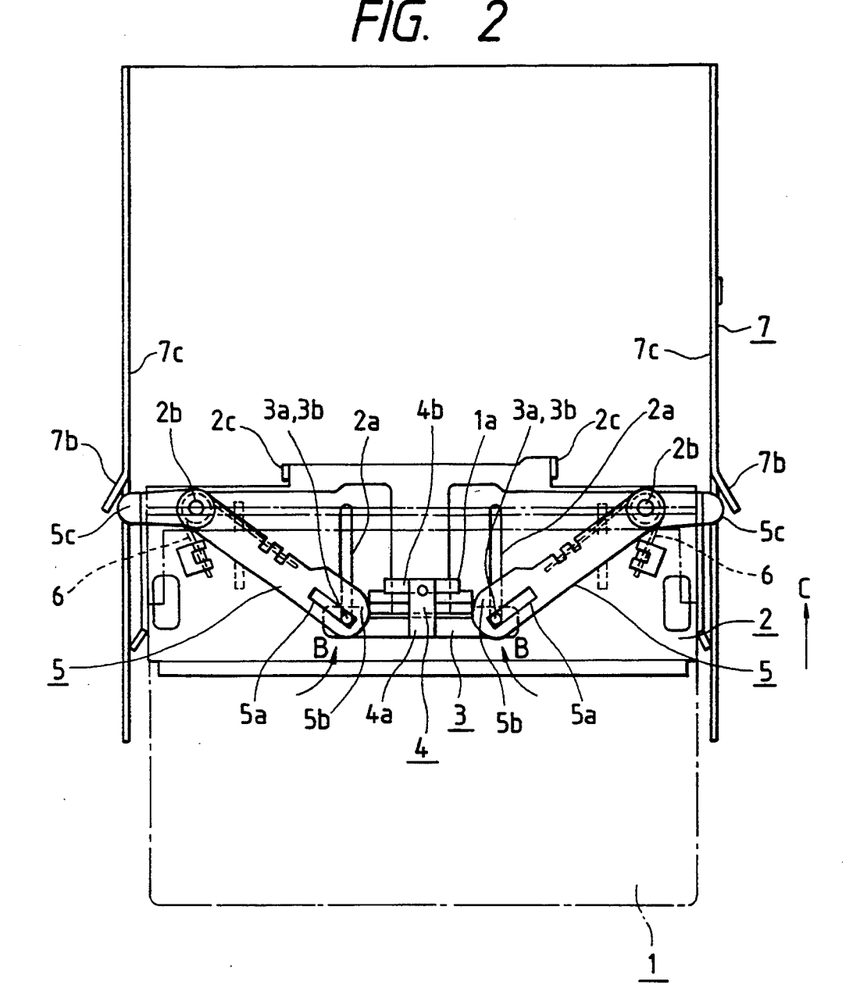
FIG. 2 is a plan view showing the cassette loading device with a cassette holder at a cassette inserting position.

FIGS. 1 and 2 are an exploded perspective view and a plan view, respectively, showing an example of a cassette loading device, which constitutes a first embodiment of the invention. In FIGS. 1 and 2, parts corresponding functionally to those which have been described with reference to FIGS. 12 and 13 are therefore designated by the same reference numerals or characters.

In FIGS. 1 and 2, reference numeral 3 designates a slide plate which is slid on a cassette holder 2 while moving along guide grooves 2a and 2a. Posts 3a and 3a are implanted in the lower surface of the slide plate 3 in such a manner that they are guided by the guide grooves 2a. The slide plate 3 is connected to an elastic engaging member 4 at the base end. The elastic engaging member 4 is to be locked to the fitting part 1a of the cassette 1.

Further in FIGS. 1 and 2, reference numeral 5 designates swing arms which are swingably mounted on support shafts 2b formed on the cassette holder 2. The swing arms 5 have loose holes 5a, in which posts 3b coaxial with the posts 3a of the slide plate 3 are loosely fitted, respectively. Each swing arm 5 is made up of an end portion 5b for preventing the body of the hook 4b from being disengaged from the fitting part 1a of the cassette 1, and an abutting portion 5c adapted to abut against a side wall 7c and a side wall piece 7b of the frame 7. A spring 6 is provided between the cassette holder 2 and each of the swing arms 5, to urge the swing arm 5 to permit the ejection of the cassette.

The operation of the cassette loading device thus constructed will be described.

When the cassette 1 is inserted into the cassette holder 2 as shown in FIG. 2, then the hook 4b of the elastic engaging member 4 is temporarily engaged with the fitting part 1a of the cassette 1. In this case, the end portions 5b of the swing arms 5 are not positioned on the side of the hook 4b which is opposite to the side where the cassette holder 2 exists, and therefore the hook 4b can disengage from the fitting part 1a of the cassette 1; that is, the cassette can be removed if necessary.

Figure 3:
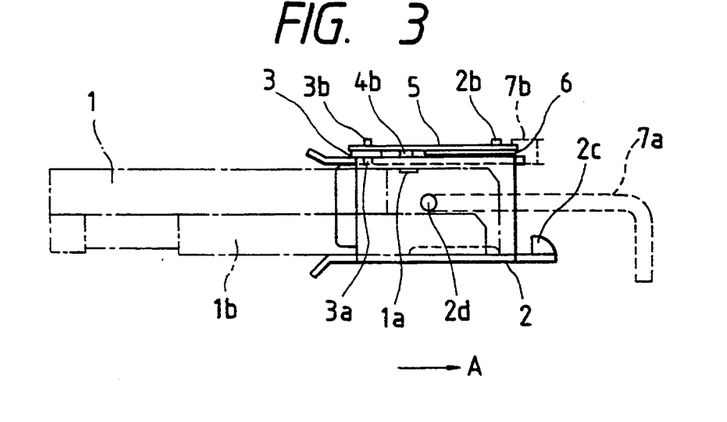
FIG. 3 is a side view showing the cassette loading device with the cassette holder at the cassette inserting position.

When the cassette 1 is further inserted, a start switch (not shown) is operated to start cassette holder moving means (not shown), so that the cassette holder 2 is moved along the L-shaped grooves 7a of the frame 7 in the direction of the arrow A in FIG. 3.

Immediately after this operation, the abutting portions 5c of the swing arms 5 abut against the side walls 7b of the frame 7, so that the swing arms 5 are swung about the supporting shafts 2b in the directions of the arrows B, respectively. As the swing arms 5 turn in this way, the posts 3a of the slide plate 3 are moved along the guide grooves 2a of the cassette holder 2 in the direction of the arrow C, and accordingly the elastic engaging member 4 is moved in the same direction.

Figure 4:
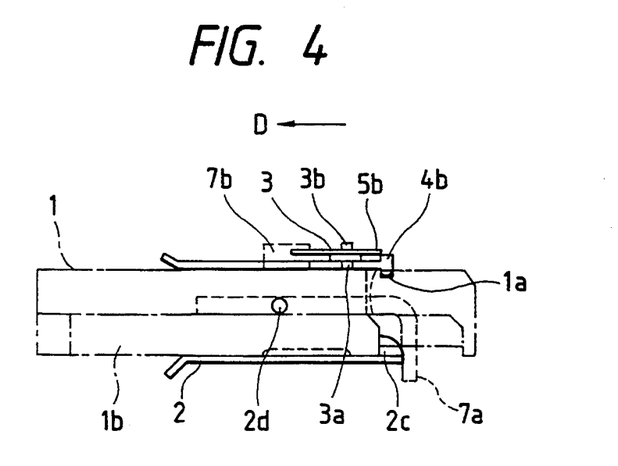
FIG. 4 is a sectional side view showing a state of the cassette loading device in operation.

As the elastic engaging member 4 is moved in the direction of the arrow C, the cassette 1 is moved in the same direction. During this movement, the slider 1b of the cassette 1 is abutted against the pawls 2c of the cassette holder 2, so that it is opened as shown in FIG. 4. On the other hand, as the swing arms 5 start turning, the end portions 5b come to the side of the hook 4b which is opposite to the side where the cassette holder 2 is located, thus holding the hook 4b, to inhibit the removal of the cassette 1.

Figure 5:
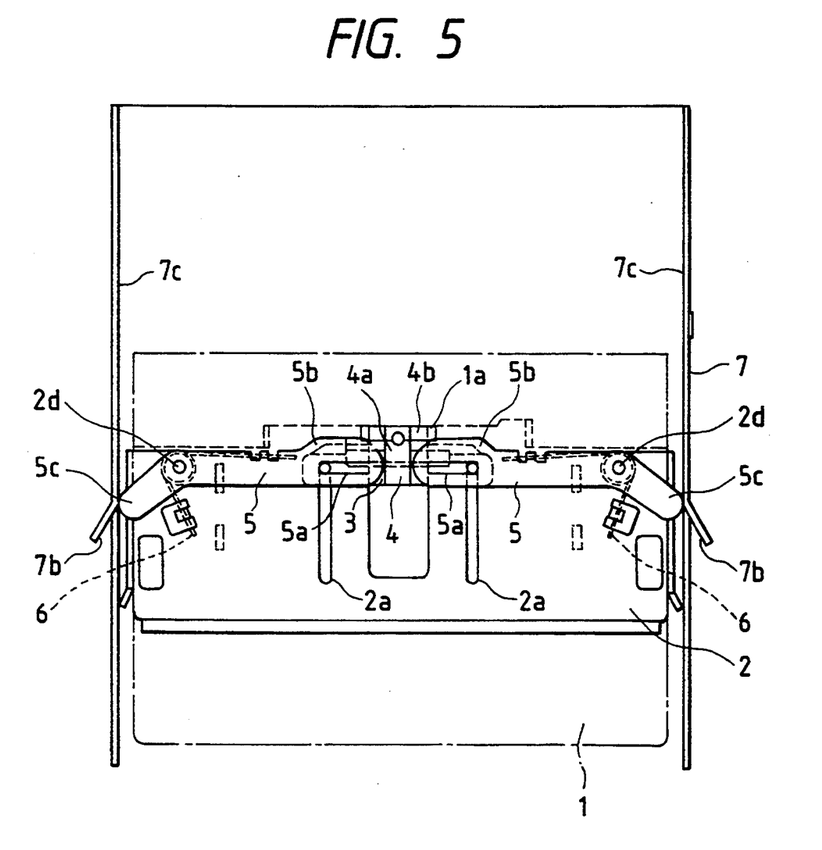
FIG. 5 is a plan view showing a state of the cassette loading device in operation.
Figure 6:
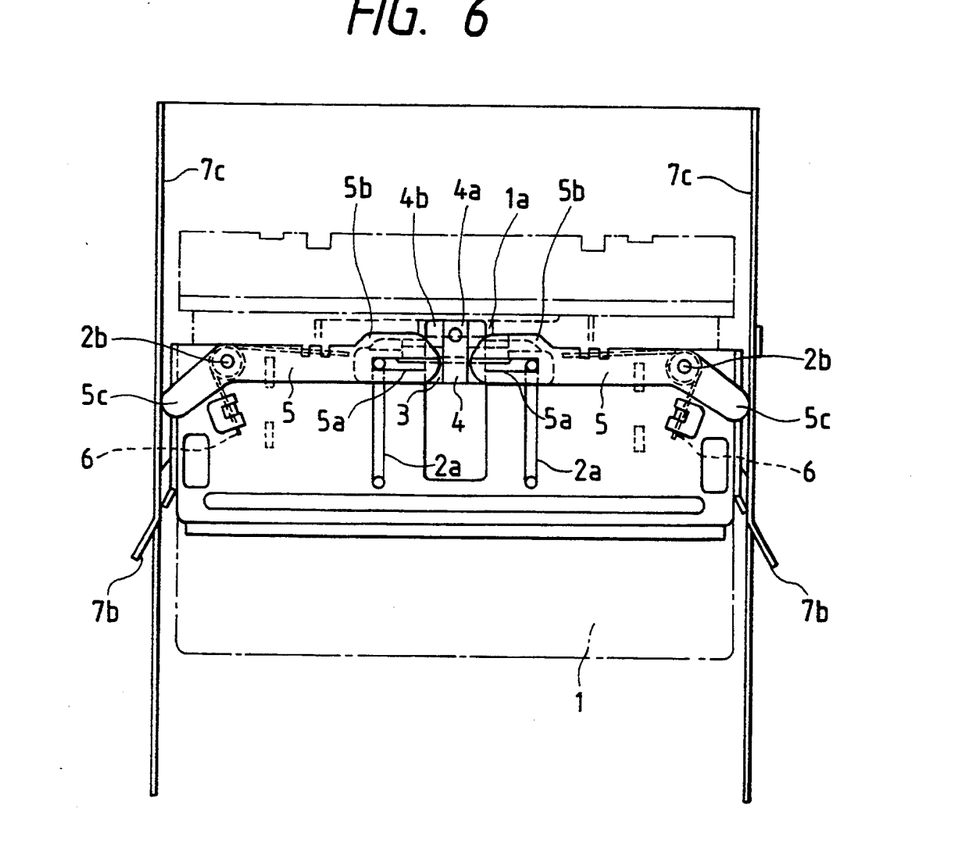
FIG. 6 is a plan view showing the cassette loading device with the cassette holder at a cassette loading position.
Figure 7:
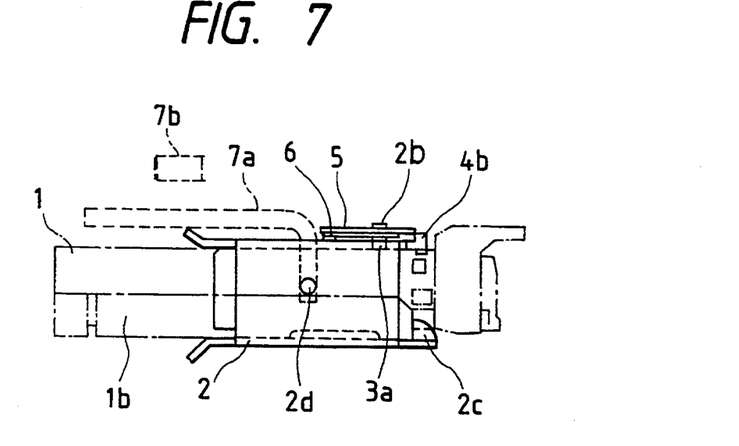
FIG. 7 is a side view showing the cassette loading device with the cassette holder at the cassette loading position.

When the swing arms 5 are turned to completely release the slider 1b as shown in FIG. 5, the cassette 1 and the cassette holder 2 are moved to the cassette loading position while the abutting portions 5c of the swing arms 5 are being brought into slide contact with the side walls 7c of the frame 7 (FIGS. 6 and 7). As the abutting portions 5c of the swing arms 5 are brought into slide contact with the side walls 7c of the frame 7 in this manner, the hook 4b is fixedly secured in position in the cassette holder 2.

Now, the cassette ejecting operation of the cassette loading device will be described.

The cassette 1, the cassette holder 2, the slide plate 3, the elastic engaging member 4, and the swing arms 5 are moved in the directions opposite to those described above. When, during the movement, the abutting portions 5c of the swing arms 5 are brought into slide contact with the side wall pieces 7b from the side walls 7c, the swing arms 5 are turned by the elastic forces of the springs 6 with the abutting portions 5c being slid on the side wall pieces 7b. As the swing arms 5 are turned in this manner, the slide plate 3 and the elastic engaging member 4 are moved in the direction of the arrow D in FIG. 4, so that the slider 1b of the cassette 1 is closed, and the cassette 1 is moved to the cassette inserting position as shown in FIG. 2.

Figure 8:
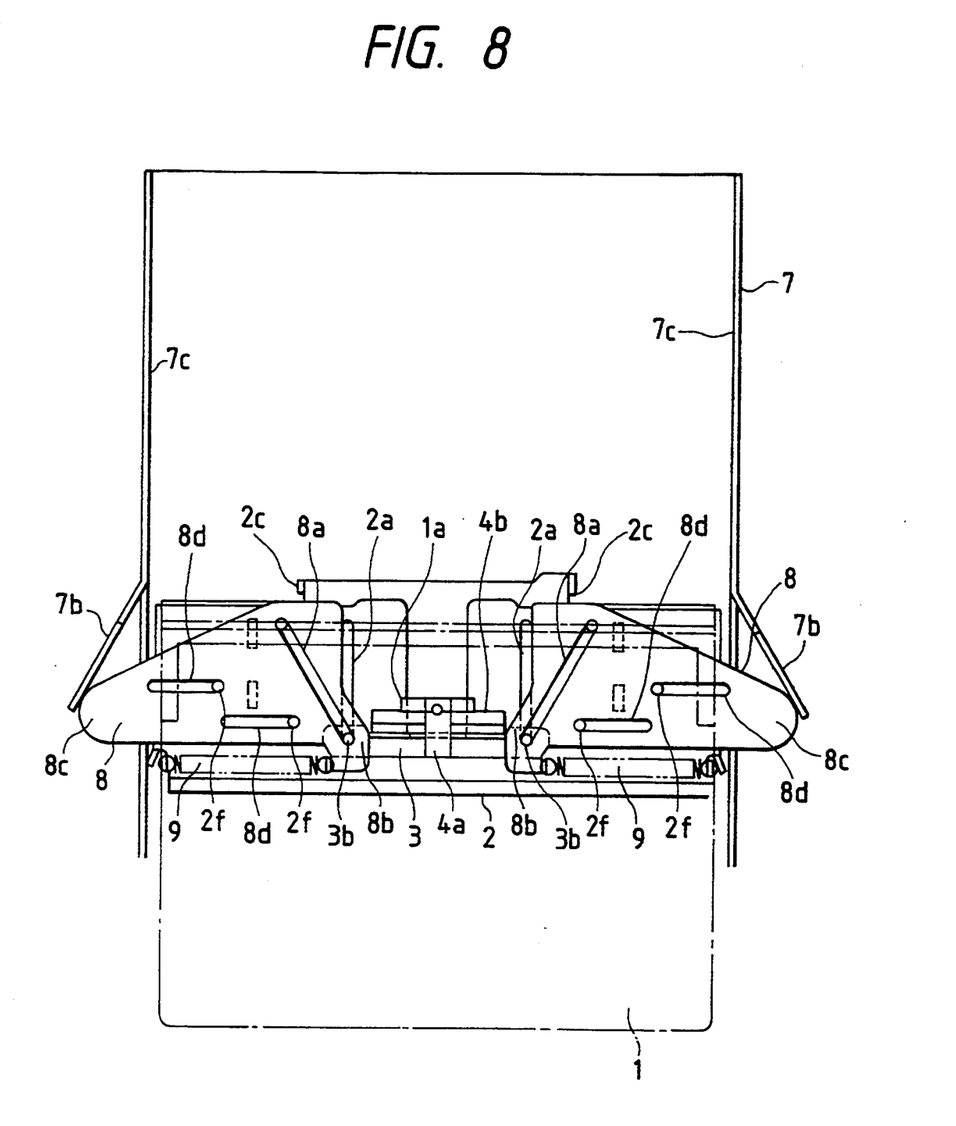
FIG. 8 is a plan view showing a state of a second example of the cassette loading device, a second embodiment of the invention, in which the cassette holder is at the cassette inserting position.

In the above-described embodiment, the swing arms 5 which are turned about the supporting shafts 2b on the cassette holder 2 are used for moving the elastic engaging member 4. However, instead of the swing arms 5, cam plate 8 as shown in FIG. 8 may be employed which slide on the cassette holder 2. This is a second embodiment of the invention. Each of the cam plate 8 includes: a guide groove 8d loosely engaged with a post 2f on the cassette holder 2; a guide hole 8a loosely engaged with the post 3b of the slide plate 3; an end portion 8b for holding the side of the hook 4b which is opposite to the side where the cassette holder 2 is located; and an abutting portion 8c which are brought into contact with the side wall piece 7b and the side wall 7c of the frame 7. In FIG. 8, reference numeral 9 designates springs which are equal in function to the above-described springs 6. The springs 9 urge the cam plates 8 outwardly.

Figure 9:
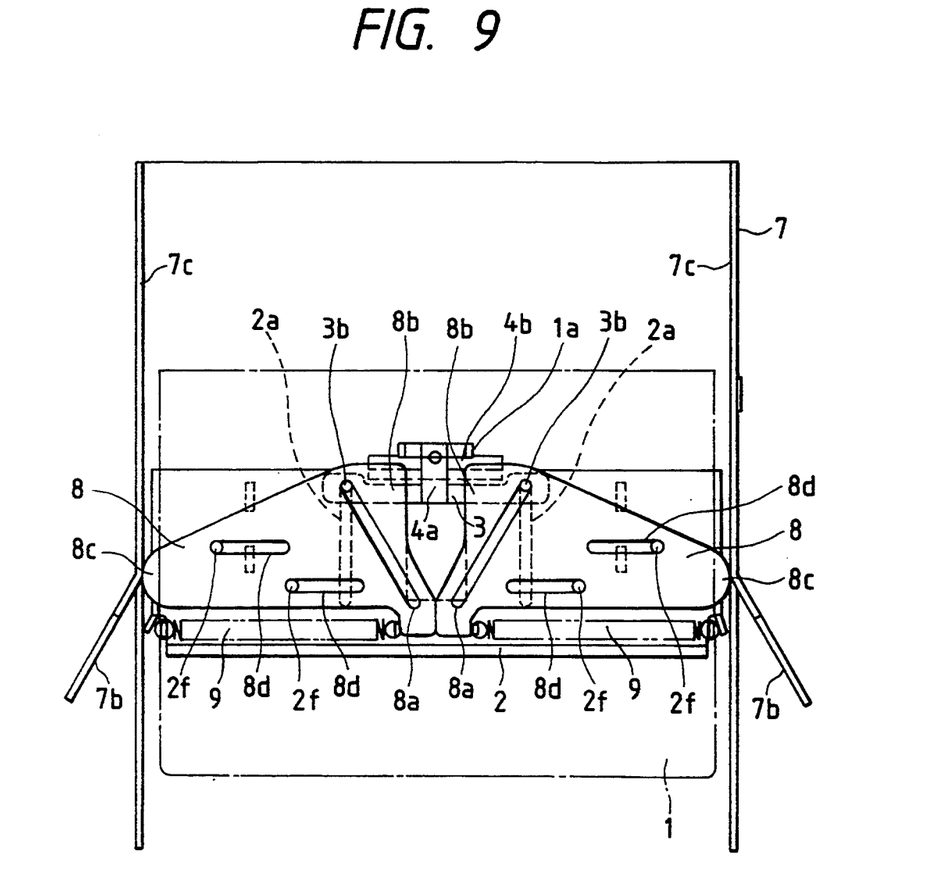
FIG. 9 is a plan view showing a state of the second example of the cassette loading device which is in operation.

In the cassette loading operation of the above-described cassette loading device (FIG. 8), as cassette holder moving means (not shown) operates, the abutting portions 8c of the cam plates 8 are abutted against the side wall pieces 7b of the frame 7, so that the cam plates 8 are moved along the guide grooves 8d against the elastic forces of the springs 9 while the posts 3b and the hook 4b are moved being guided by the guide holes 8a and the guide grooves 2a, as shown in FIG. 9. As the cam plates 8 are operated in this way, then the end portions 8b come to the side of the hook 4b which is opposite to the side where the cassette holder 2 is located, thus preventing the disengagement of the hook 4b from the fitting part 1a; that is, inhibiting the removal of the cassette 1.

Figure 10:
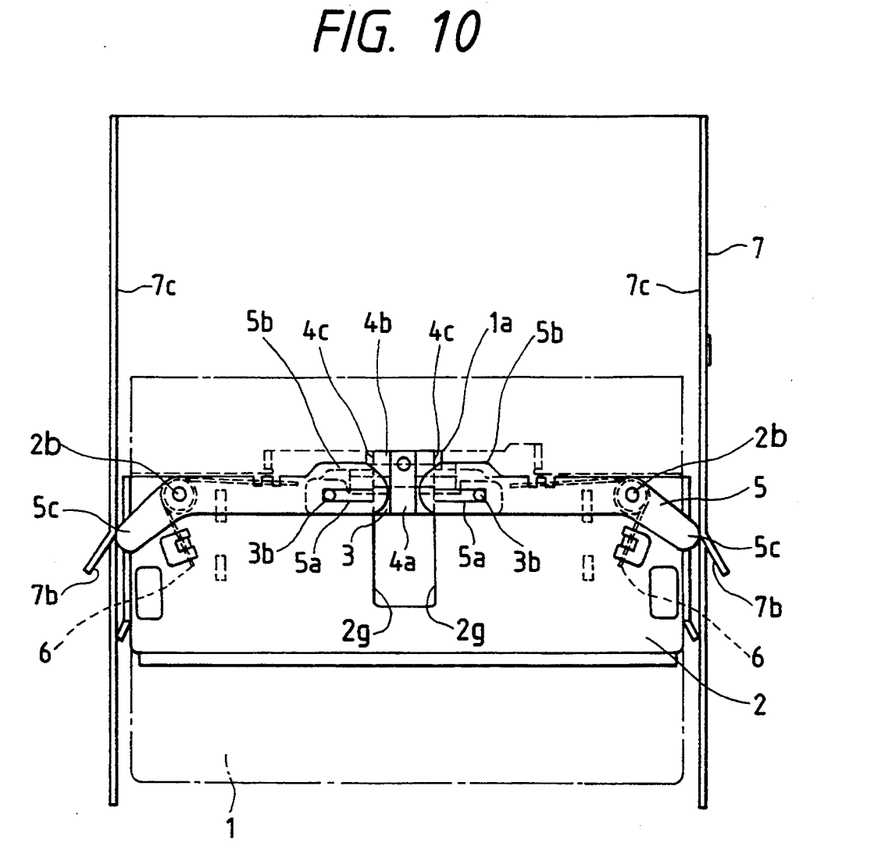
FIG. 10 is a plan view showing a state of a third example of the cassette loading device, a third embodiment of the invention, which is in operation.

In the cassette ejecting operation, the above-described components are operated in the directions opposite to those described above in the cassette loading operation, with the same effects as those in the first embodiment. In the above-described embodiment, the elastic engaging member 4 is moved with the posts 3a engaged with the guide grooves 2a; however, as shown in FIG. 10, the elastic engaging member 4 may be moved by using end faces 4c of the hook 4b instead of the posts 3a and by using end faces 2g of the cassette holder 2 instead of the guide grooves 2a.

Figure 11:
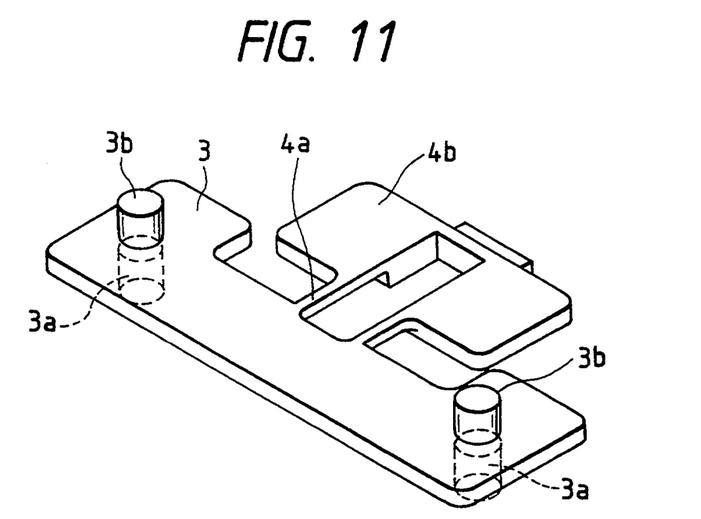
FIG. 11 is a perspective view showing an elastic engaging member which is a modification of the one shown in the above-described embodiments.

Furthermore in the above-described embodiments, the slide plate 3 and the elastic engaging member 4 are individual parts; however, they may be provided as one part as shown in FIG. 11.

The cassette loading device of the invention is so designed that the engaging member is operated over the cassette holder. Therefore, the slider of the cassette can be opened and closed during operation of the mechanism, and in starting the cassette loading device, the cassette can be pushed in with a short stroke, and the springs are decreases in the amount of deflection as much, and accordingly the cassette pushing force is reduced. When the cassette holder is at the cassette inserting position, the engaging member is temporarily engaged with the fitting part of the cassette, permitting the insertion or removal of the cassette. As soon as the swing arms start turning, the disengagement of the engaging member from the fitting part of the cassette is inhibited, and therefore, during operation of the mechanism, the cassette is prevented from falling off the cassette holder. Furthermore, in the cassette loading device of the invention, the engaging member is operated over the cassette holder, as was described above. Therefore, in the cassette loading device of the invention, the difficulty is not involved that the cassette holder is moved to the cassette inserting position with the engaging member engaged with the fitting part of the cassette, and the pushing levers strike against the front end face of the cassette to produce big striking sounds. That is, with the cassette loading device, the cassette ejecting operation is achieved smoothly. Moreover, since the cassette ejecting mechanism is provided on the cassette holder, the depth of the device can be reduced as much.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cassette loading device comprising:
   a cassette holder in which a cassette is inserted, said cassette holder being linearly movable without pivoting between a cassette inserting position and a cassette loading position, the cassette holder being movable in a first direction generally in a first plane;
   a frame for guiding said cassette holder;
   said frame including side wall pieces;
   an engaging member slidably mounted to said cassette holder, adapted to engage with a fitting part of said cassette;
   slide cam members, which are slidably mounted on said cassette holder, connected to said engaging member;
   such that when said said cassette holder is at said cassette inserting position, said engaging member is temporarily engaged with said fitting part of said cassette, thus allowing the insertion and removal of said cassette;
   when said cassette is inserted into an intermediate position, between said cassette inserting and cassette loading position, into said cassette holder, portion of said slide cam members abut said side wall pieces of said frame causing said engaging member to be moved along a guide groove formed in said cassette holder by said slide cam members as said cassette holder is moved;
   said slide cam members prevent said engaging member from being disengaged from said cassette fitting part during the movement of said engaging member between said cassette inserting position and said intermediate position;
   and wherein said slide cam members slide in a second direction generally in a second plane, the first and second directions being generally perpendicular and the first and second directions being generally parallel and noncoincident.

2. The cassette loading device as claimed in claim 1, wherein said engaging member is moved along said guide groove in association with said cassette holder, to open and close a slider of said cassette.

3. A cassette loading device comprising:
   a cassette holder in which a cassette is inserted, said cassette holder being linearly movable without pivoting between a cassette inserting first position and a cassette loading position, the cassette holder being moveable in a first direction generally in a first plane;
   a frame for guiding said cassette holder;
   said frame including side wall pieces;
   an engaging member slidably mounted to said cassette holder, adapted to engage with a fitting part of said cassette;
   swinging arms, which are swingably mounted on said cassette holder, connected to said engaging member;
   such that when said cassette holder is at said cassette inserting position, said engaging member is temporarily engaged with said fitting part of said cassette, thus allowing the insertion and removal of said cassette;
   when said cassette is inserted into an intermediate position, between said cassette inserting and cassette loading position, portions of said swinging arms abut said side wall pieces of said frame causing said engaging member to be moved along a guide groove formed in said cassette holder by said swinging arms as said cassette holder is moved;
   said swinging arms prevent said engaging member from being disengaged from said cassette fitting part during the movement of said engaging member between said cassette inserting position and said intermediate position;
   and wherein said swing arms are pivotable about pivot axes toward and away from one another, the pivot axes being generally parallel and extending in a second direction, the first and second directions being generally perpendicular.

4. The cassette loading device as claimed in claim 3, further comprising:
   means for opening and closing a slider provided on said cassette in conjunction with the movement of said engaging member between said cassette inserting and cassette loading positions.

5. The cassette loading device as claimed in claim 3, further comprising:
   means for urging said engagement member toward said cassette inserting position.

6. A method of loading a cassette with a device having a cassette holder adapted to accommodate said cassette therein and movable between a cassette inserting position and a cassette loading position, an engaging member slidably mounted on said cassette holder and adapted to engage with a fitting part of said cassette, a frame for guiding said cassette holder, said frame having side wall pieces, and swing arms swingably mounted to said cassette holder, said swing arms connected to said engaging member, said method comprising the steps of:
   (a) inserting said cassette into said cassette holder positioned at said cassette inserting position to confront said cassette fitting part with said engaging member positioned at a first depth relative to said cassette holder;
   (b) moving said cassette holder linearly toward said cassette loading position without pivoting of said cassette holder;
   (c) simultaneously with said step (b), moving said engaging member engaged with said fitting part of said cassette relative to said cassette holder to be positioned at a second depth deeper in the cassette holder than said first depth, the step (c) of moving said engaging member by said swing arms having portions abutting said frame side wall pieces during movement of said cassette between the cassette insertion and loading positions; and
   (d) pivoting the swing arms toward one another about pivot axes, the pivot axes being generally parallel and extending in a direction generally perpendicular to a direction in which the cassette holder is moved.

7. The cassette loading device as claimed in claim 1, wherein the frame surrounds at least three sides of the cassette and cassette holder.

8. The cassette loading device as claimed in claim 3, wherein the cassette holder moves horizontally and wherein the swing arms pivot about vertically extending axes relative to the cassette holder and the frame.

9. The cassette loading device as claimed in claim 3, wherein the engaging member engages said fitting part provided on the cassette, the cassette having four sides, a top surface and a bottom surface, the fitting part being located on the top surface of the cassette and being spaced from the four sides thereof, the engaging member being received in the fitting part of the cassette during insertion of the cassette and being lifted from the fitting part during removal of the cassette from the cassette holder, the engaging member being lifted in the second direction.

10. The cassette loading device as claimed in claim 3, wherein the frame surrounds at least three sides of the cassette and cassette holder.

11. A method of loading a cassette with a device having a cassette holder adapted to accommodate said cassette therein between a cassette inserting position and a cassette loading position, an engaging member slidably mounted on said cassette holder and adapted to engage with a fitting part of said cassette, a frame for guiding said cassette holder, said frame having side wall pieces, and slide cam members which are slidably mounted on said cassette holder, said slide cam members connected to said engaging member, said method comprising the steps of:

(a) inserting said cassette into said cassette holder positioned at said cassette inserting position to confront said cassette fitting part with said engaging member positioned at a first depth relative to said cassette holder;

(b) moving said cassette holder linearly toward said cassette loading position without pivoting of said cassette holder;

(c) simultaneously with said step (b), moving said engaging member engaged with said fitting part of said cassette relative to said cassette holder to be positioned at a second depth deeper in the cassette holder than said first depth, the step (c) of moving said engaging member by said slide cam members having portions abutting said frame side wall pieces during movement of said cassette between the cassette insertion and loading positions, (d) sliding said slide cam members in a second direction generally in a second plane, the first and second directions being generally perpendicular and the first and second directions being generally parallel and noncoincident.

* * * * *